Feb. 22, 1938.    R. J. ALDEN    2,108,791
DECELEROMETER
Filed March 1, 1935    2 Sheets-Sheet 1

INVENTOR
REGINALD J. ALDEN
BY Chapin & Neal
ATTORNEYS

Feb. 22, 1938.    R. J. ALDEN    2,108,791
DECELEROMETER
Filed March 1, 1935    2 Sheets-Sheet 2
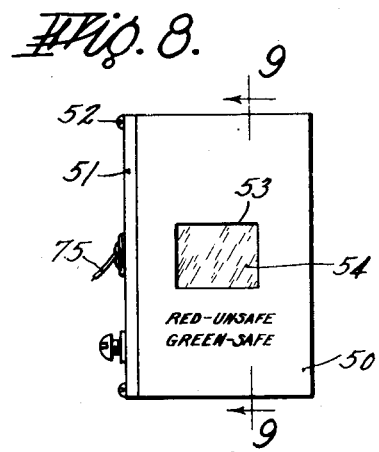
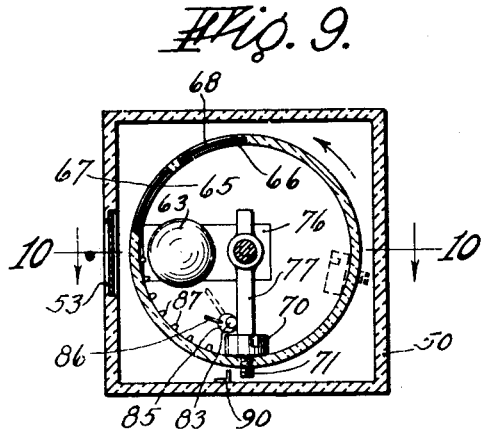
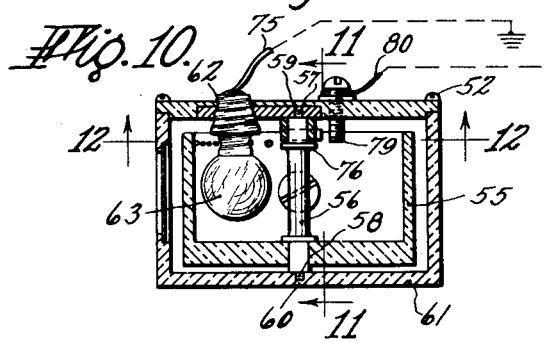
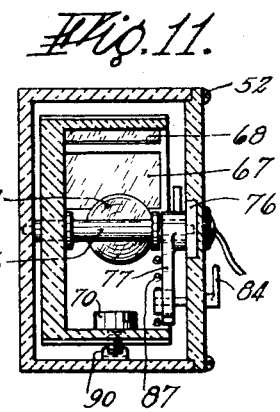
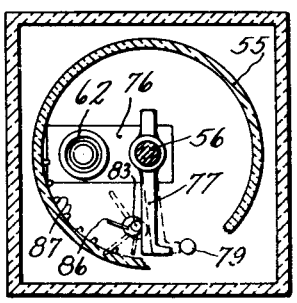
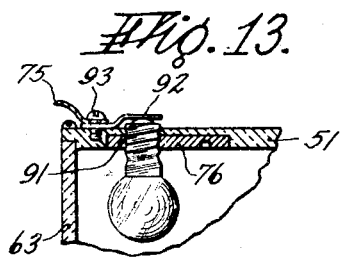
INVENTOR
REGINALD J. ALDEN
BY Chapin & Neal
ATTORNEYS Patented Feb. 22, 1938

2,108,791

UNITED STATES PATENT OFFICE 2,108,791

DECELEROMETER

Reginald J. Alden, New York, N. Y., assignor to Chapin & Neal, Springfield, Mass., a firm Application March 1, 1935, Serial No. 8,921

5 Claims. (Cl. 177—311.5)

This invention relates to decelerometers for use in testing the operation of the braking system of motor cars and the like. More particularly it relates to a decelerometer of the type in which a body, moving under the influence of the momentum imparted by the original motion of the car, gives successive indication as the car is abruptly slowed down by the application of the brakes.

One object of the invention is to provide a simple and inexpensive but reliable device for the above purpose suitable for use as a permanent or semi-permanent car instrument, or as an auxiliary instrument to be temporarily placed in the car for the period of the test.

Another object of the invention is the provision of an instrument of this class, in which the indications given as the inertia actuated body moves to its final indicating position are not repeated in reverse direction as the body returns to rest position.

A further object is to provide an instrument of this class in which the indicator of the instrument persists until released or at least for a period sufficient to afford ample time for a deliberate inspection of the reading.

Other and further objects residing in the construction and arrangement of the parts will be obvious from the following specification and claims.

In the accompanying drawings:

Fig. 8 is a front view of an alternative form of the invention;

Fig. 9 is a sectional view substantially on line 9—9 of Fig. 8;

Fig. 10 is a sectional view substantially on line 10—10 of Fig. 9;

Fig. 11 is a sectional view substantially on line 11—11 of Fig. 10;

Fig. 12 is a fragmentary sectional view substantially on line 12—12 of Fig. 10, the lamp bulb being removed; and Fig. 13 is a detail view partly in section showing a modified form of lamp mounting.

Figure 1:
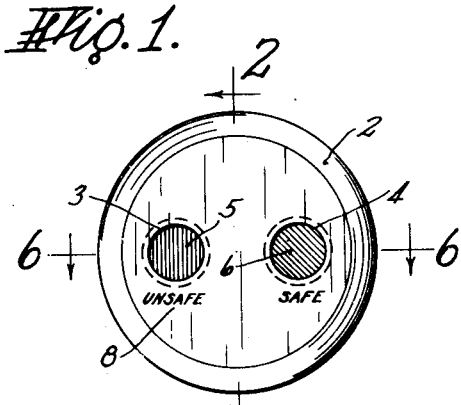
Fig. 1 is a front view of an instrument according to the present invention.

Referring to Figs. 1 to 7 of the drawings, 1 indicates a cup-like casing, formed of bakelite or other suitable material, provided with a closure 2 which forms the front face of the instrument. The closure member is provided with spaced window openings 3 and 4 respectively provided with panes 5 and 6 of transparent material, such as glass or celluloid colored red and green respectively. The cover may be provided adjacent the openings with descriptive indicia as indicated at 8, if desired.

A flat, generally rectangular member 10 which carries the operating parts of the device is positioned vertically within the casing 1 intermediate the windows and is held in place by the tightness of its fit or in any other suitable manner.

Figure 7:
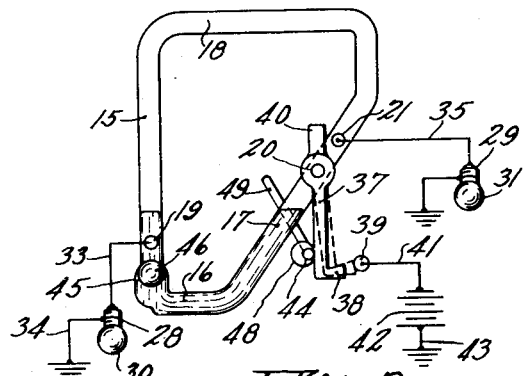
Fig. 7 is a diagrammatic view of the electrical circuit of the device.
Figure 2:
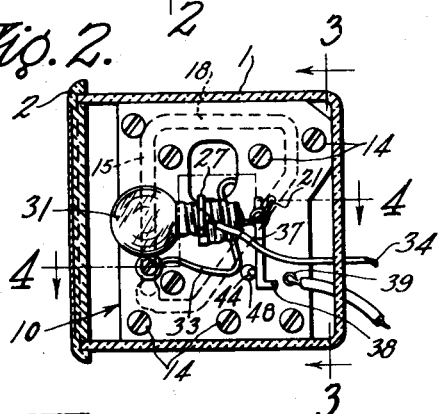
Fig. 2 is a sectional view substantially on line 2—2 of Fig. 1.
Figure 3:
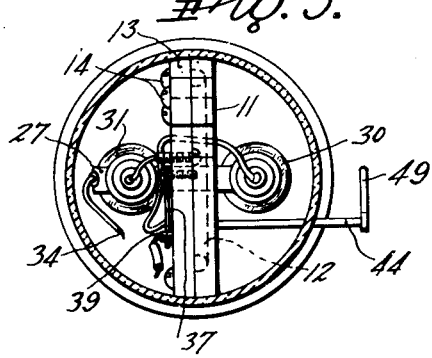
Fig. 3 is a sectional view substantially on line 3—3 of Fig. 2.
Figure 5:
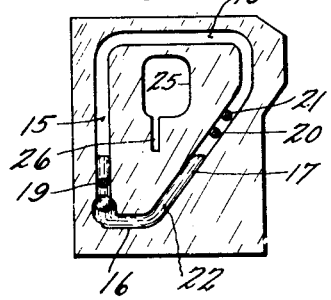
Fig. 5 is a detail view of the mercury containing member with the cover plate removed.
Figure 6:
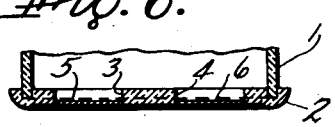
Fig. 6 is a fragmentary sectional view substantially on line 6—6 of Fig. 1.

The member 10 comprises a body plate 11, provided with an endless groove 12, and a cover plate 13 which is tightly secured to the body plate by screws 14, forming groove 12 into a closed channel. Plates 11 and 13 are formed of bakelite or other suitable non-conducting material. The groove or channel 12, best shown in Fig. 7, has a vertical portion 15, a lower horizontal portion 16, a forwardly inclined portion 17 and an upper horizontal portion 18. An electrical contact 19 passes through the member 10 into portion 15 of the channel and two similar contacts 20 and 21 are positioned in spaced relation in the inclined portion of the channel. A quantity of mercury indicated at 22 in Figs. 5 and 7 is enclosed in channel 12.

Member 10 is formed with a generally rectangular opening 25, having a vertical slot 26 extending downwardly therefrom. A metal bar 27 is provided at its ends with electric light sockets 28 and 29. Opening 25 is of a size to permit one end of the bar 27 and the socket carried thereby to be passed through after which the bar is moved downwardly to wedge the bar tightly in slot 26 and position the sockets 28 and 29 respectively opposite the window openings 3 and 4 so that when electric bulbs 30 and 31 are positioned in the sockets and lighted the colored panes in the window openings are illuminated.

A conductor 33 connects contact 19 with the central terminal of socket 28, the other terminal of said socket being connected through bar 27 and conductor 34 to the ground of the electrical system. Contact 21 is connected by conductor 35 to the central terminal of socket 29, the other terminal of which is grounded through bar 27 and conductor 34.

Contact 20 is provided outwardly of the member 10 with a freely swinging pendulum switch member 37, the lower end 38 of which is adapted to swing into abutting engagement with cooperating switch member 39 as later more fully described. Member 37 is preferably counterbalanced above the pivot 20 as indicated at 40. Member 39 is connected by a conductor 41 to a source of electric current such as battery 42 which may be the battery of the motor car where the instrument is permanently or semi-permanently installed in the car. The other terminal of the battery is grounded as indicated at 43.

Having reference to Fig. 7 the operation of the structure so far described may be briefly summarized as follows. With the car travelling at a uniform speed the parts are in the position shown in Fig. 7 and it will be evident that the circuits through both lamps are open. If now the brakes are applied to bring the car to rest the inertia of the mercury in portions 16 and 17 of the tube causes the mercury to advance in the tube to bring the mercury into engagement with contact 20, and at the same time pendulum switch member is thrown forward by its own inertia into abutting contact with member 39 to close the circuit between contact 20 and the battery 42. The quantity of mercury is such and the contacts 19, 20 and 21 so spaced that the forward movement of the mercury first connects the contacts 19 and 20 closing the circuit through the red lamp 30 and, if the deceleration of the car is sufficiently abrupt the resulting continued movement of the mercury causes it to leave contact 19 and continue up the inclined portion of the tube, thus opening the circuit through lamp 30, and connecting contacts 20 and 21 to close the circuit through the green lamp 31. Upon substantial completion of the deceleration of the car, that is when the car is either brought quickly to substantially a state of rest, or its rate of deceleration is decreased to a degree where the movement of the car so nearly approximates uniform motion that the mercury starts to fall back in the tube under the action of gravity, the switch member 37 also under the action of gravity, falls away from contact 39. Such movement of member 37 instantly opens the circuit between contact 20 and the battery, with the result that the green light is extinguished and the red lamp is not lighted when the mercury, in its return movement again connects members 19 and 20. The rearward swing of the pendulum member 39 is halted by a rod 44 which brings member 39 to rest in normal position.

Figure 4:
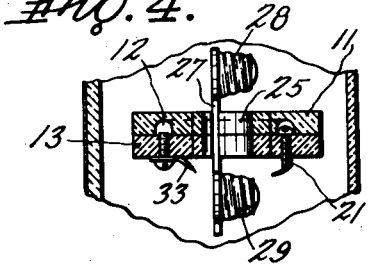
Fig. 4 is a fragmentary sectional view substantially on line 4—4 of Fig. 2.

It is sometimes desirable to hold the mercury in its forward position a sufficient length of time to permit inspection and reading of the instrument after the car has been brought to rest and for this purpose the channel 12 is provided with an enlarged cylindrical portion 45 in the vertical arm 15 of the channel just below contact 19. A steel ball 46 positioned in the cylindrical portion 45 acts as a check valve to prevent the immediate return of the mercury into normal position in the channel, thus maintaining the mercury in whatever circuit closing position it has assumed in response to the rate of deceleration of the car. This preservation of the reading of the instrument is made dependent on the will of the operator by controlling pendulum switch 37 which normally would open the battery circuit as soon as or shortly before the car comes to rest. This control is accomplished by means of an eccentric cam 48 secured to rod 44. Rod 44 extends through casing 1 and as best shown in Fig. 4 is provided with a handle 49 by which the operator may rotate rod 44 and cam 48 to move pendulum member 37 into contact with member 39 as shown in dotted line in Fig. 7 and hold it there.

After the car has been brought to a stop and the reading observed the circuit may be broken by turning handle 49 to return cam 48 to the full line position of Fig. 7, thus releasing pendulum member 37. Vibration of the car during a short period of subsequent operation causes sufficient vibration of ball 46 to permit the mercury to slowly assume its normal position.

In Figs. 8 to 13 is shown an alternate arrangement in which an eccentrically weighted cylinder acting like a pendulum is employed as the inertia actuated member. As shown in said figures this alternative form comprises a box-like casing 50 formed of bakelite or other suitable material. The open side of the casing is provided with a closure plate 51, of similar material, removably secured to the casing by screws 52. One face of the casing is formed with a window opening 53 provided with a clear pane 54 of glass, celluloid or the like. A cup-like cylindrical member 55 secured to a metal shaft 56 is rotatably mounted in the casing by means of trunnions 57 and 58 formed on the ends of shaft 56 and engaging in bearing recesses 59 and 60 respectively formed in a metal strip 76 set in cover plate 51 and the opposite wall 61 of the casing. The open end of the cylinder 55 is positioned adjacent the cover plate 51 and the latter plate is provided with an electric light socket 62 adapted to receive a lamp bulb 63 which projects into the cylinder 55 opposite window 53. Cylinder 55, as best shown in Fig. 9, is provided with spaced window openings 65 and 66 respectively provided with red and green panes 67 and 68, formed of glass, celluloid or the like, which panes are arranged to be brought successively into registration with the window opening 53 and bulb 63 upon rotation of the cylinder in the direction of the arrow in Fig. 9. The cylinder 55 is provided with a weight 70 which as shown is provided with a threaded stud 71 engaging in a suitably threaded opening in the cylinder. As shown in Fig. 9 the parts are so arranged that in normal position, as when the car by which the instrument is carried, is in uniform motion, an unbroken portion of the cylinder is interposed between lamp 63 and window 54. As the car decelerates under the application of its brakes the inertia of the weight 70 causes cylinder 55 to rotate about its axis in the direction of the arrow to bring the red window between opening 53 and the lamp and if the rate of deceleration is sufficient the further movement of the weight advances the cylinder to move the green window into position between opening 53 and the lamp.

Lamp 63 is provided with current from the car's battery or other suitable source, the circuit arrangement being best indicated in Fig. 10. The central terminal of socket 62 is grounded by a conductor 75, the other socket terminal being connected by metal strip 76, to the metal shaft 56. A freely swinging pendulum switch member 77 similar to member 37 previously described is rotatably mounted on shaft 56 between strip 76 and a collar 78 formed on the shaft. The lower end of member 77 is adapted to be swung into contact with a contact pin 79 secured in cover plate 51 and connected by a conductor 80 to the car battery, diagrammatically indicated at 81, the other terminal of the battery being grounded as indicated at 82. As in the previously described structure a rod 83, see Figs. 11 and 12, serves to arrest the return swing of member 77. Rod 83, which extends outside of the casing is provided with a handle 84, and carries a cam 85 adapted to releasably hold the switch members 77—79 closed when the reading of the instrument is temporarily preserved by restraining the return of the drum to normal position. Such restraint of the drum may be accomplished by means of a flexible reed 86 secured to rod 83, and normally positioned as shown in full lines in Fig. 12. When the instrument reading is to be preserved rotation of handle 84 moves cam 85 into switch closing position and simultaneously swings reed 86 into the path of lugs 87 formed on the inside of drum 55. The reed 86 is sufficiently flexible so that the lugs 87 brush by it as the drum is rotated by the inertia of weight 70 but when the limit of rotation is reached the resistance of the reed is sufficient to sustain the dead off balance weight of member 70 and the reading is preserved until the subsequent vibration of the car in operation jars the drum back to normal position.

It will be evident that in ordinary operation deceleration of the car causes switch member 77 to move into contact with member 79 closing the circuit and lighting lamp 63, and that simultaneously drum 55 is rotated by the inertia of weight 70 to bring window 67, or windows 67 and 68 in succession between opening 54 and the lighted lamp, the extent of movement of the drum depending on the rate of deceleration. When the reading of the instrument is to be temporarily "preserved" handle 84 is operated to manually close switch 77—79, thus lighting the lamp and maintaining it lighted, while at the same time retaining reed 86 is moved into operative position.

Excessive over-travel of the drum in the reverse direction is prevented by a stop 90 secured to the bottom of the casing and positioned to be engaged by the projecting stud 71 of the weight.

If desired the conventional socket 62 may be omitted and the lamp bulb directly threaded into strip 76 and the cover plate 51 as indicated at 91 and the central bulb termination is connected to conductor 75 by a spring contact 92 secured to the cover 51 by screw 93.

I claim:

1. A decelerometer for use in motor cars which comprises a plurality of electrically operated signal means indicative of predetermined rates of deceleration, electric circuits controlling said signal means, a member having a closed channel formed therein, a body of mercury enclosed in the channel, said body of mercury being movable within the channel in response to the deceleration of the car, a plurality of spaced electrical contacts positioned in the channel in the path of movement of the mercury, the spaces between the contacts forming gaps in said electrical circuits, said gaps being successively closed by the movement of the mercury along the channel to successively actuate said signal means in a predetermined sequence and inertia operated switch means controlling said circuits independently of the movement of the body of mercury and operative upon the substantial completion of the deceleration of the car to open said circuits.

2. A decelerometor for use in motor cars which comprises a plurality of electrically operated signal means indicative of predetermined rates of deceleration, parallel electric circuits respectively controlling said signal means, a member having a closed channel formed therein, a body of mercury enclosed in the channel, said body of mercury being movable within the channel in response to the deceleration of the car, a plurality of spaced electrical contacts positioned in the channel in the path of movement of the mercury, the spaces between the contacts each forming a gap in one of said parallel circuits, said gaps being successively closed by the movement of the mercury along the channel to successively actuate said signal means in a predetermined sequence and an inertia operated switch positioned in series with each of said gaps in said parallel circuits and operative upon the substantial completion of the deceleration of the car to open said circuits.

3. A decelerometor for use in motor cars which comprises a plurality of electrically operated signal means indicative of predetermined rates of deceleration, electric circuits controlling said signal means, a member having a closed channel formed therein, a body of mercury enclosed in the channel, said body of mercury being movable within the channel in response to the deceleration of the car, a plurality of spaced electrical contacts positioned in the channel in the path of movement of the mercury, the spaces between the contacts forming gaps in said electrical circuits, said gaps being successively closed by the movement of the mercury along the channel to successively actuate said signal means in a predetermined sequence, an inertia operated switch member normally controlling said circuits independently of the movement of the body of mercury and operative upon the substantial completion of the deceleration of the car to open said circuits, manually operated means for controlling said switch member and a check valve in said channel to releasably restrain return of the mercury along the channel.

4. A decelerometor for use in motor cars which comprises, signal means to indicate an unsafe rate of deceleration, and signal means to indicate a safe rate of deceleration, an oscillatory signal actuating member normally held in inoperative position by gravity and movable by its inertia to successively actuate and deactuate said unsafe signal means and actuate said safe signal means, in response to predetermined rates of deceleration, and returnable to its inoperative position by gravity upon substantial completion of the deceleration of the car, and means automatically operative in response to the substantial completion of the deceleration of the car to prevent reactuation of the unsafe signal means during the return movement of said signal actuating member after actuation of the safe signal means.

5. A decelerometor for use in motor cars which comprises, signal means to indicate an unsafe rate of deceleration, and signal means to indicate a safe rate of deceleration, an oscillatory signal actuating member normally held in inoperative position by gravity and movable by its inertia to successively actuate and deactuate said unsafe signal means and actuate said safe signal means, in response to predetermined rates of deceleration, and returnable to its inoperative position by gravity upon substantial completion of the deceleration of the car, means automatically operative in response to the substantial completion of the deceleration of the car to prevent reactuation of the unsafe signal means during the return movement of said signal actuating member after actuation of the safe signal means, means to releasably restrain the return of the signal actuating member to its inoperative position, and means manually operable by the operator to inhibit operation of the said reactuation preventing means to thereby render said restraining means effective to preserve the final indication of the signal means.

REGINALD J. ALDEN.